Nov. 4, 1969  D. P. HASS ET AL  3,476,225
MESH FORCING WITH AN ENGINE CONNECTED BRAKE
Filed Sept. 20, 1967  3 Sheets-Sheet 1
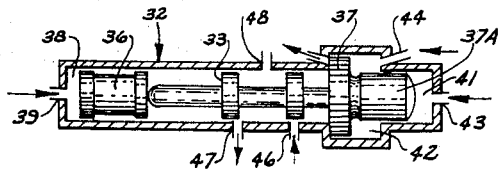
FIG.1A
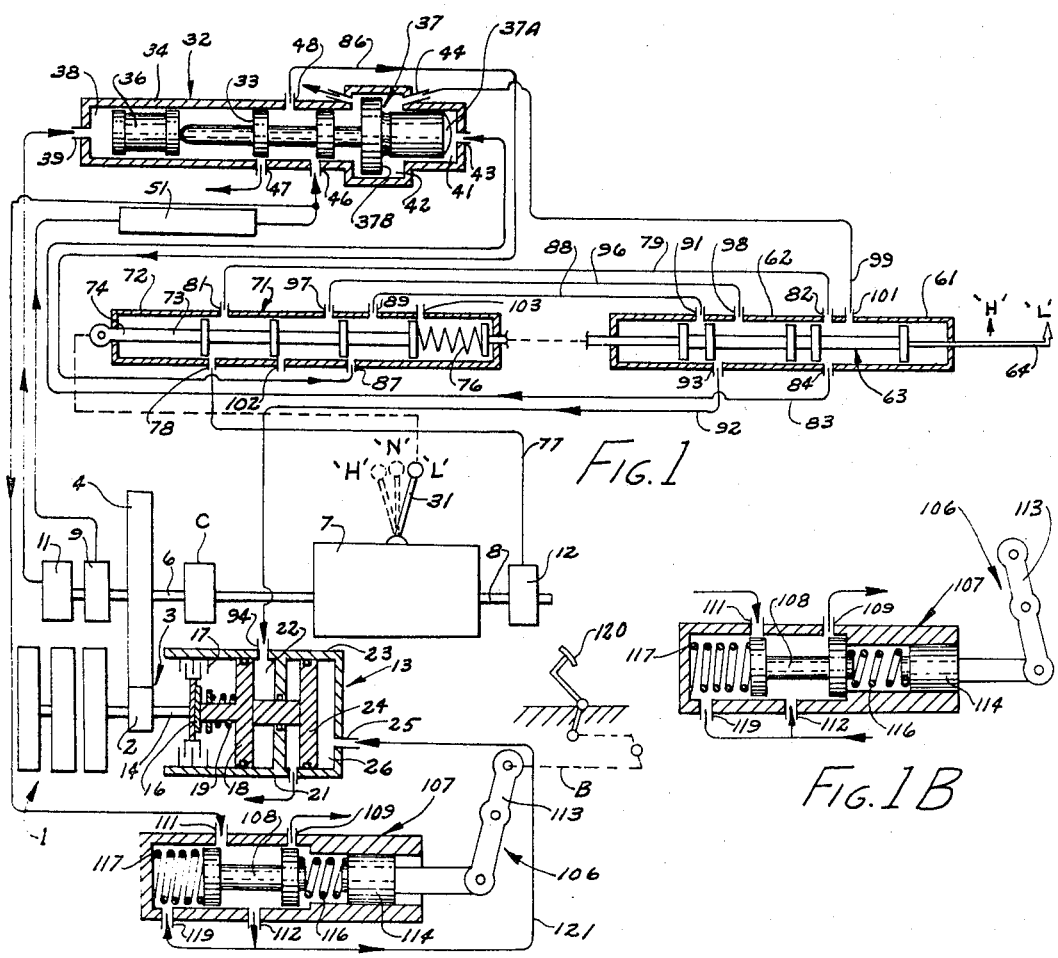
FIG.1
FIG.1B
INVENTORS
DAVID P. HASS
RALPH P. HORAN
BY
Woodhams, Blanchard & Flynn
ATTORNEYS INVENTORS
DAVID P. HASS
RALPH P. HORAN
BY
Woodhams, Blanchard & Flynn
ATTORNEYS INVENTORS
DAVID P. HASS
RALPH P. HORAN
BY
Woodhams, Blanchard and Flynn
ATTORNEYS

United States Patent Office

3,476,225
Patented Nov. 4, 1969

3,476,225
MESH FORCING WITH AN ENGINE
CONNECTED BRAKE
David P. Hass, Detroit, and Ralph P. Horan, Birmingham, Mich., assignors to Eaton Yale & Towne Inc., Cleveland, Ohio, a corporation of Ohio
Filed Sept. 20, 1967, Ser. No. 669,046
Int. Cl. F16d 67/00; F16h 3/38, 57/10
U.S. Cl. 192—4
12 Claims

ABSTRACT OF THE DISCLOSURE

A change-speed gear transmission driven by a prime mover, such as a turbine, having a tendency toward excessive speed when the load is removed and brake means connected to the prime mover for preventing such excessive speed of the prime mover when the transmission is in neutral. The invention further contemplates opposing said tendency toward excessive speed by an adjustable application of said brake means to control the input speed to the transmission for shift synchronizing purposes.

---

This invention relates to an assembly of a prime mover, such as a gas turbine, having a tendency toward excessive speed when the load is removed and a gear transmission utilizing spur gears. It particularly relates to such an assembly wherein an appropriate control is exercised over the speed of the prime mover for assisting the shifting of the transmission.

In the development of gas turbines for automotive use, a variety of problems have been encountered of which one of the most troublesome has been the association of the turbine with effective transmission means for providing suitable speed ratios between the turbine output and the drive wheels of the vehicle. While the so-called two shaft, or free, turbine has more nearly approached the ideal torque curve for vehicular applications than the earlier known single shaft turbine, it is still desirable for the usual, and well-understood, reasons to interpose a ratio-changing device between the turbine output and the drive wheels of the vehicle. Some efforts in this direction have taken the form of torque converters, which, however, are not particularly efficient when used with a single shaft turbine and are even less efficient when used with a free turbine. This efficiency can be appreciably improved if the turbine is used with a transmission of the spur gear type but this introduces the problem of turbine run-away when the transmission is in neutral. This problem is serious enough in itself but it also complicates the synchronizing of the ratio gears during a shifting operation. Hence, it has in the past been thought that a transmission of the spur gear type, to be effective with a gas turbine, would either have to be capable of being shifted practically instantaneously or that means would have to be provided by which the transmission would impose a constant load on the turbine even during its shifting procedure. The first of these possibilities is not feasible in a transmission of substantial weight, such as the transmissions used in a highway bus or in a truck, due to the weight of the parts and the time consequently required to overcome their inertia in connection with a shifting operation. The second of these possibilities (as envisioned in U.S. patent application Ser. No. 551,446, now Patent. No. 3,412,625 assigned to the same assignee as the present invention) is a substantial improvement in at least some respects over torque converters since it does obtain the advantages of spur gear power transmission but, as presently known, it requires a slip clutch and over-running mechanisms within the transmission, which mechanisms are subject to wear and therefore subject to the possibility of considerable maintenance.

Accordingly, the objects of the invention include:

(1) To provide a transmission of the spur gear type for cooperation with a prime mover of the type having a tendency toward excessive speed when the load is removed, such as a gas turbine, wherein shifts can be made quickly and easily and without subjecting the prime mover to the possibility of a dangerous speed increase during the shifting operation.

(2) To provide apparatus, as aforesaid, wherein by suitable control mechanism a turbine can be utilized with a spur gear transmission of a conventional, or substantially conventional, type thereby to avoid the expense and uncertainty of designing an entirely new type of transmission and to utilize the presently available experience in designing, tooling, manufacturing and selling patterns and maintenance procedures presently known for standard spur gear transmissions.

(3) To provide means, as aforesaid, in which the runaway tendency of the turbine is, instead of a problem to overcome, utilized at least in a downshift operation to provide assistance for effecting rapid and smooth meshing of the transmission gears.

(4) To provide means, as aforesaid, constituting a novel system consisting of an engine control means and a transmission all assembled together in a novel relationship with respect to each other whereby the control means automatically responds to conditions within the transmission and controls the speed of the engine in such a manner that it actually functions to assist shifting and remeshing of the transmission gears.

(5) To provide an apparatus and a system, as aforesaid, wherein the relationship between the engine and the transmission is of a sufficiently simple and straight-forward nature that the control means can be of relatively simple design.

(6) To provide apparatus, as aforesaid, utilizing combined sensing and controlling means for increasing or decreasing turbine speed as necessary to bring the about-to-be-shifted gears into synchronism and then effecting an interengagement when such synchronism is obtained.

(7) To provide a system and apparatus, as aforesaid, which will be of sufficient structural simplicity as to be economically acceptable from a manufacturing standpoint and from the standpoint of effective maintenance.

(8) To provide a system, as aforesaid, which can be carried out by equipment which will be sturdy and reliable.

Other objects and purposes of the invention will be apparent to persons acquainted with apparatus of this general type upon reading the following specification and inspecting the accompanying drawings.

In the drawings:

FIGURE 1 is a schematic diagram of a transmission and shifting control system embodying the invention.

FIGURE 1A is an illustration of the modulating valve showing same in a position opposite to that shown in FIGURE 1.

FIGURE 1B is a drawing of the manual brake valve showing same in a position opposite to that shown in FIGURE 1.

GENERAL DESCRIPTION

Figure 2:
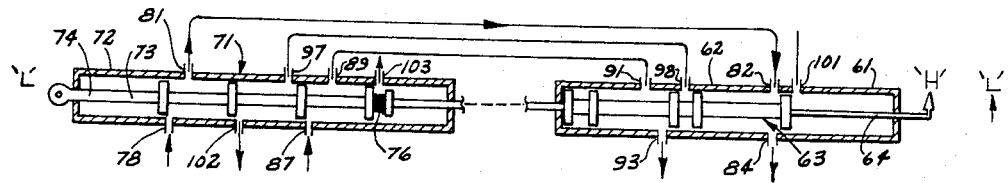
FIGURE 2 is a schematic representation of two control valves, namely the transposition valve and the manual valve, in a first step in an upshift sequence.

In attaining the objects and purposes above set forth, the invention contemplates providing sensing means connected to both the input and output of the transmission and relating to the given transmission ratio which is to be obtained. A control unit is provided and it functions in response to the sensing means to apply a braking force to permit the transmission to be shifted to neutral and, when the transmission is in neutral, to permit an increase, or effect a decrease, in turbine speed as needed to bring the about-to-be-engaged gears into proper synchronism with each other while preventing runaway of the turbine. When synchronism is obtained other means are then actuated to complete the shift.

It will be noted that this approach is to be distinguished from synchronism predicting arrangements previously proposed, such as that embodied in the patent to Perkins No. 2,943,582, even though they may seem superficially similar in that they both effect a comparison of input and output speeds of a transmission. In the transmission control shown in Patent No. 2,943,852, the engine is essentially a free agent even though it is sometimes speeded up or slowed down by suitable controls provided therefor and the transmission control is arranged to sense the approach of synchronism and effect a shift when synchronism occurs. Synchronism could, however, occur very quickly and no attempt is therein made to move the parts to a given predetermined speed relationship to each other. In the present arrangement, the speed of the prime mover is held under actual control and synchronism is forcibly maintained long enough to effect the shift. Under circumstances where the load speed is changing very rapidly, such as with a heavy truck being driven up-hill, the turbine speed can still be maintained synchronously with respect to the output speed so that the gears to be shifted are held synchronously with respect to each other for as long a period of time as needed so that synchronism can be actually sensed and the shift then completed.

This system is to be further distinguished from the common use of a countershaft brake. It is known in reciprocating engine systems for the operator to increase engine speed by suitably actuating the accelerator but an increase of speed is not an automatic function of reciprocating engines, as it is in the case with turbines when the load is removed. It is also known to use a countershaft brake to slow the main clutch driven disc and the transmission shafts, but a countershaft brake does not directly slow the speed of the engine. Rather a reciprocating engine is slowed by its internal friction, pumping losses, etc., when the fuel supply is shut off. On the other hand, the turbine has more "thermal inertia" in that hot gases continue to drive the turbine for a period of time even though the fuel supply has been cut off. Hence, with reciprocating engines the countershaft brake does not control an increase in the speed of the engine, whereas the braking force applied according to the present invention is applied for this purpose.

DETAILED DESCRIPTION

Referring now to the drawings, there is shown schematically a typical apparatus embodying the invention. A two shaft, or free turbine has been selected, for illustrative purposes, as the prime mover inasmuch as the apparatus was designed primarily with such a prime mover in mind. However, it will be recognized that the apparatus of the invention will be effective with other kinds of prime movers having a tendency, either inherent or induced, toward excessive speed when the load is removed.

A gas turbine 1 of the two shaft, or free, type is connected through the high-speed side 2 of conventional reduction gearing 3 to the low speed side 4 thereof and thence through a shaft 6 and clutch C to the input side of a conventional shiftable spur-gear transmission 7. In this embodiment for simplicity it will be assumed that said transmission 7 is a two-speed transmission, but it will be apparent that the principles of the invention are applicable also to transmissions having higher numbers of speed ratios therein. The output of the transmission is represented by a shaft 8 and same may be connected to any load to be driven.

A pump 9 of any conventional type, such as a conventional air compressor of a truck or a hydraulic pump connected in an oil circuit, may be operatively connected to one of the shafts, here for convenience the input side of the transmission represented by the shaft 6. A pair of governor devices 11 and 12, such as governor valves, hereinafter designated as first and second governor devices, respectively, are also connected to the input and output sides of the transmission 7 for producing pressures at the outputs of said governor devices proportional to the speeds of rotation of the input and output shafts of said transmission 7. Such governor devices are well known in automotive automatic transmissions and need no further description.

A braking or retarding mechanism 13 is operatively connected to the turbine 1 by any convenient means, such as the shaft 14 connected to the high-speed side 2 of the reduction gearing 3. Said brake 13 may be of any convenient type capable of operation upon the application of fluid pressure thereto. In the embodiment shown in the drawing, said brake 13 is of the disc type and has a rotor 16 provided with discs rotatable therewith and interleaved with nonrotating discs of which one is indicated at 17. A piston 18 operates against a spring 19 for applying pressure to the rotor 16 and thereby effecting operation of the brake. Said piston 18 operates within a suitable cylinder 21 defining a pressure chamber 22. The introduction of pressure into the chamber 22 actuates the piston 18 as above indicated.

A supplemental cylinder 23 is associated in tandem with the cylinder 21 and it contains a piston 24 connected in series with the piston 18. Said cylinder 23 defines a chamber 26 into which pressure may be introduced for purposes hereinafter described.

The transmission 7 may be actuated in any convenient manner, such as by a shift lever 31 having in this embodiment three positions, namely low, neutral, and high as indicated, "L" indicating the low-speed position, "N" indicating the neutral position, and "H" indicating the high-speed position. Said low-speed position and high-speed position may be of any ratios desired, the value of said ratios having no effect upon the applicability of the present invention.

A brake pressure transmitting valve, or modulating valve, is indicated at 32 and in this embodiment comprises a valve spool 33 slideably arranged within a suitable casing 34 and having pistons 36 and 37 arranged at each end thereof. The piston operates within a chamber 38 and responds in a conventional manner to pressure applied at the port 39 from the first governor 11. The piston 37 has two areas indicated at 37A and 37B operating respectively in cylinders 41 and 42. A port 48 is provided for constant communication with the space between the lands of the spool 33 in all positions thereof and ports 46 and 47 are provided for alternative communication with said space depending upon the position of said spool. As shown, the pump 9 is connected, preferably through a pressure regulating unit 51 of any conventional type to the port 46. Port 47 is a vent port connected to the low pressure side of the pressure fluid circuit of pump 9.

The manual valve 61 is here shown schematically as having a casing 62 with a spool 63 therein and any convenient means, such as a manually operable rod 64, for selecting the desired position of said spool. Said manual valve has a plurality of ports as described in more detail hereinafter and said spool 63 has a plurality of lands to provide the connections hereinafter set forth.

A transposition valve 71 is provided and it comprises a casing 72 and a spool 73. Ports are provided in said casing and lands are provided on said spool to effect suitable connections as further described hereinafter. Mechanical means including the rod 74 are provided for connecting said spool 73 to the shift lever 31. Other mechanical means of a resilient nature, herein indicated by a spring 76, are provided for connecting the spool 63 of the manual valve 61 with the spool 73 of the transposition valve 71. It will be recognized, of course, as the description proceeds that the spring 76 is merely a schematic indication of the application of resilient pressure to the spool 73 in response to the position of the spool 63 and that a variety of other devices, such as an air cylinder, suitably controlled by the position of the spool 63, may be provided in place of said spring to actuate the spool 73.

A conduit 77 connects the second governor 12 to the port 78 of the transportation valve 71. A conduit 79 connects the port 81 of the transportation valve 71 to the port 82 of the manual valve 61. A further conduit 83 connects the port 84 of the manual valve 61 to the port 43 of the modulating valve 32.

A conduit 86 connects the port 48 of the modulating valve 32 to a port 87 of the transposition valve 71. A conduit 88 connects the port 89 of the transposition valve 71 to the port 91 of the manual valve 61. A conduit 92 connects the port 93 of the manual valve 61 to the inlet port 94 communicating with the pressure chamber 22 of the brake 13. A conduit 96 connects the port 97 of the transposition valve 71 to the port 98 of the manual valve 61 and a conduit 99 connects the port 101 of the manual valve to the port 44 of the modulating valve 32. A vent 102 is provided in the transposition valve 71 to the low pressure side of the system pressure generated by the pump 9, which may be to atmosphere if said pump 9 is an air compressor, and a port 103 similarly vents another portion of the transposition valve 71 to said low pressure side of the system pressure generated by the pump 9.

The precise relationship of the several ports above mentioned with respect to the manual valve 61 and the transposition valve 71 and the relationship to the lands of the spools 63 and 73 will be evident from the drawings and will be further brought out in the description of the operation of the apparatus.

A manually operable brake pressure device 106 may be provided for controlling manually the pressure to be applied to the interleaved plates of the brake 13. A valve casing 107 is provided with a spool 108 slideable therein and adapted for effecting alternate communication between the ports 109 and 111 with the port 112. A lever 113 is connected by any suitable linkage B to the conventional clutch pedal 120 of the vehicle. The lever 113 is adapted to move a plunger 114 coaxially with the spool 108 and cause same to assume a position as selected by the operator. Springs 116 and 117 are arranged at opposite ends of said spool 108 for bearing oppositely against said spool 108, the spring 117 being supplemented through the port 119 by pressure exiting from the port 112 and the spring 116 being adjustably loadable according to the position of the plunger 114. A conduit connects the ports 112 and 119 as shown and a further conduit 121 connects said last-named ports to the port 25 communicating with the chamber 26.

A manually or a pedally controlled clutch C may be provided if desired, but preferably in the transmission input 6 for reasons which will be well understood.

While not shown, it will be understood that either synchronizers or blockers may be used in the transmission to prevent interengagement of a set of ratio gears prior to synchronization thereof and to permit such interengagement when synchronization is achieved. Such apparatus being a part of standard transmission construction, the same will be well understood by those skilled in the art and no specific description thereof will be necessary.

OPERATION

Assuming first that the apparatus is in its neutral position with the clutch C open, the turbine 1 will act through the reduction gearing 3 to maintain pressure at the output of the pump 9. Pressure will also be maintained at the output of the governor 11. Said governor pressure will be applied at port 39 of the modulating valve 32 to hold the spool 33 thereof in the rightward position shown in FIGURE 1.

Figure 4:
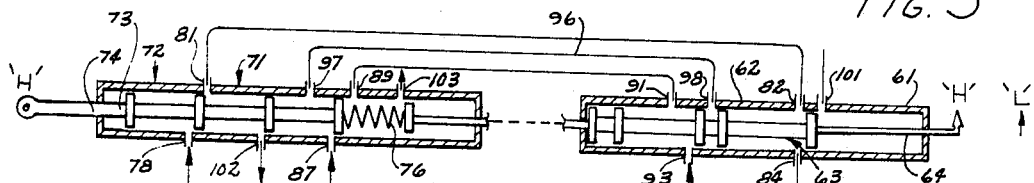
FIGURE 4 is a schematic representation of said two control valves in a third and final step of the upshift sequence.

In either the "H" or "L" position of the manual valve 61, and with the transposition valve 71 being in a corresponding position, the brake 13 is depressurized. Thus, in the shifted "L" position, chamber 22 is connected to exhaust by conduit 92, ports 93, 98, conduit 96, to vent port 102 (FIGURE 1). In the shifted "H" position, chamber 22 is connected by conduit 92, ports 93, 91, conduit 88 to vent port 103 (FIGURE 4). Hence other means must be provided for preventing turbine runaway while the clutch "C" is open. This is provided by the brake pressure device 106 which may either be hand operated or may be mechanically interconnected with the clutch pedal as indicated by the broken line "B." When the clutch is opened, the upper end of the lever 113 moves rightwardly as appearing in the drawing which moves the plunger 114 leftwardly and connect the port 111 to the port 112. Thus, pressure from the pump 9 is applied to the conduit 121 and thence to the port 25 of the brake 13 for acting against the piston 24 to apply the brake.

Considering now just the operation of the modulating valve 32, the spool 33 thereof is normally urged rightwardly by the pressure fluid supplied by governor 11. The spool 33 is urged leftwardly at selected times as described in greater detail herebelow by pressure fluid supplied by governor 12. When the spool 33 is in its rightward position pressure fluid appears at port 48 and this can serve to apply the brake. When the spool 33 is in its leftward position, port 48 is connected to vent port 47 and the brake is released.

The position of the spool 33 is a function of the difference of the pressure fluid forces applied on pistons 36 and 37. The pressure of the fluid applied on pistons 36 and 37 is determined by the governors 11 and 12. Thus, the position of the spool 33 is responsive to the speeds of the shafts 6 and 8. In the low-speed setting of the transmission, when the output shaft 8 is rotating at a lower speed than the input shaft 6 so that the output pressure of governor 12 is less than the output pressure of governor 11, in order to have the leftwardly acting force be equal to the rightwardly acting force when the shaft speeds are in the right relationship, the leftwardly acting pressure fluid is applied to both chambers 41 and 42 so that the pressure supplied by governor 12 is multiplied by an area factor equal to the ratio of the speeds of the shafts 6 and 8 when the transmission is in the low-speed setting.

In the high-speed setting of the transmission, the fluid pressure from governor 12 is supplied only to chamber 41. In the illustrated embodiment, it is assumed that in the high-speed setting there is a 1:1 ratio of the speeds of the shafts 6 and 8. Thus, the area of the leftward end of piston 36 is the same as the area of the surface 37A. Thus, equal forces will be applied on the pistons when the speeds of the shafts are equal.

It will be understood, therefore, that when the speed of shaft 6 is higher than is required for synchronism with shaft 8 for the particular gear ratio to be established in the transmission, the spool 33 will be in its rightward position for supplying pressure fluid to apply brake 13 to slow down the shaft 6. As soon as the speed of shaft 8 becomes greater than that required for synchronism with shaft 6, the spool 33 shifts leftwardly and no fluid pressure is applied on brake 13.

Inasmuch as the leftwardly and rightwardly acting forces on the spool 33 are of similar value at least during the time the spool is being shifted, when the transmission is in neutral such shifting is effected at a steady controlled rate. Hence the rate at which pressure builds up in or is released from the chamber 22 also is controlled. That is, the lands on the spool 33 move across the ports 46 and 47 at a controlled rate responsive to the governors 11 and 12 whereby the resultant pressure appearing at port 48 is modulated and thereby the pressure applied on the brake 13 is also modulated so that the speed of the turbine is closely controlled. The braking force is increased or decreased at a rate proportional to the difference between pressures from the governors 11 and 12. Thus, the braking force is effective to so control the speed of the turbine that the gears next to be engaged will be held at or moved toward synchronism with each other.

The vehicle is started by releasing the clutch "C" which engages the transmission and at the same time permits the core 108 of the valve 107 to move rightwardly. This closes the port 111 and connects the brake chamber 26 by means of the passageway 121 and port 112 to the vent port 109. The brake is thus released and the brake load will be removed from the turbine 1.

Figure 3:
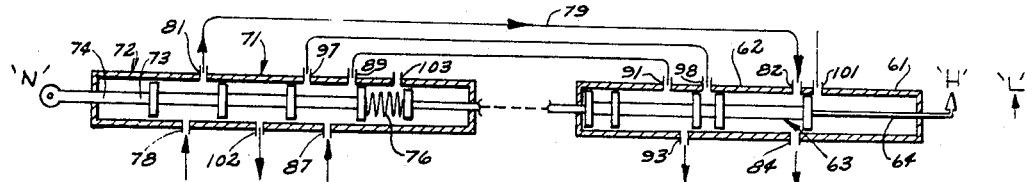
FIGURE 3 is a schematic representation of said two control valves in a second step of the upshift sequence.

When it is desired to shift from the "L" to the "H" position, the manually operable control member 64 is moved leftwardly as appearing in FIGURE 2 which compresses the spring 76. This applies a mechanical pressure onto the rod 74 tending to move the shift lever 31 from its "L" toward its "H" position, but same cannot move immediately due to the driving pressure on the gear teeth. At the same time conduit 99 is depressurized so that pressure is applied from governor 12 only in chamber 41. Since shaft 6 is rotating faster than shaft 8, because the transmission is still in its low-spaced setting, the pressure in chamber 38 is greater than the pressure in chamber 41 and the valve spool 33 is moved to its rightward position. The pressure from the pump 9 is thus connected because of the rightward position of the spool 33 of the modulating valve 32 from the port 46 thereof to the port 48 and thence through the passageway 86 to the port 87 of the transposition valve 71. The pressure is then conducted from the port 89 to the conduit 88 to the port 91 and from there to the port 93 and conduit 93 to the port 94 into chamber 22 of the brake 13. This applies the brake with a full braking force and terminates or diminishes the pressure on the teeth of the engaged gears of the transmission 7. This permits the transmission to respond to the mechanical force applied to the rod 74 and move into its neutral position (FIGURE 3). At this time pressure from governor 12 is supplied through ports 78, 81, conduit 79, ports 82, 84 and conduit 83 to port 43. However, at this instant, the rightwardly acting force in chamber 38 is sufficient to hold the valve 32 in its rightward position (FIGURE 1).

In the neutral position the parts of valves 61 and 71 occupy the position shown in FIGURE 3. In this position full pressure is still held on the brake 13 to prevent runaway of the turbine and to slow down the speed thereof and at the same time pressure from the first governor 11 is applied to the port 39 of the modulating valve 32 to continue urging the core thereof rightwardly. The conduit 88 and 96 become pressurized by pressure fluid from port 87 so that pressure fluid is supplied to both ports 91 and 98. The brake 13 remains applied and not only prevents runway of the turbine but slows it toward the speed required to synchronize the shaft 6 with the shaft 8 in the high gear position. As the shaft 6 is slowed down, the pressure at port 43 from governor 12 will become sufficient with respect to the pressure at port 39 from governor 11 to cause the modulating valve core 33 to move leftwardly. Shifting of the spool 33 leftwardly closes the port 46 at a controlled rate and opens the port 47 at a controlled rate so that the brake pressure diminishes at a controlled rate whereby the speed of shaft 6 can increase at a controlled rate to move same into synchronism with shaft 8 so that the shaft is connected smoothly. The rod 74 still under the mechanical pressure of the spring 76, likewise moves leftwardly to the FIGURE 4 position to complete the shift into the "H" position. At the same time shifting of the core 73 of the transposition valve leftwardly connects the vent 103 to the port 89 and thus depressurizes the brake 13. Thus, the brake is released and the turbine resumes driving the input shaft 6. Also port 81 is in communication with vent 102, so that there is no pressure in chamber 41. Thus, the valve spool 33 shifts to its rightward position in readiness for the next shift.

Thus, during an upshift the brake 13 is initially applied under full pressure to relieve the driving force. When the transmission reaches neutral, the brake will continue to be applied to slow down the shaft 6. The braking force will diminish at a controlled rate as the gears or clutch teeth next to be engaged approach synchronism and will reach a level at which the shaft 6 is held at synchronous speed so that the shift can be completed easily. If for any reason, such as improper positioning of the gear teeth or clutch teeth, the same cannot mesh at this time and the shaft 6 speeds up to a higher speed than is required for the gears or clutch teeth to mesh, then the brake will be immediately reapplied under a controllable pressure to restore the speed of shaft 6 to the proper value.

Figure 5:
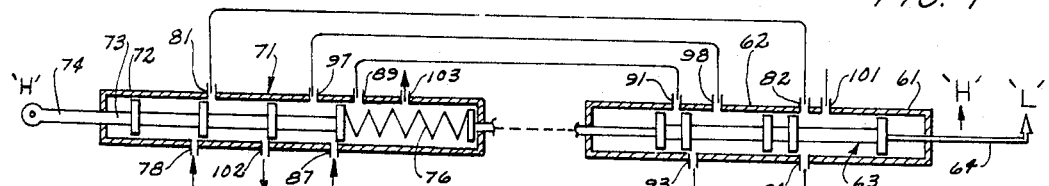
FIGURE 5 is a schematic representation of said two control valves in the first step of a downshift sequence.
Figure 6:
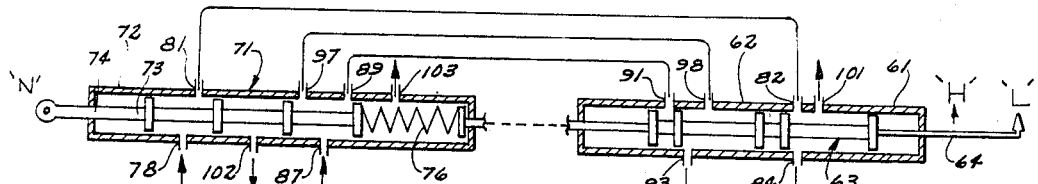
FIGURE 6 is a schematic representation of said two control valves in a second step of the downshift sequence.

When it is desired to shift from the "H" to the "L" position, the manual control 64 is moved rightwardly as shown in FIGURE 5. The pressure appearing at the port 46 and consequently at the port 87 of the transposition valve is now conducted from the port 97 thereof through the conduit 96 to the port 98 of the manual valve 61, thence to the port 93 thereof and thence to the brake 13 to apply full brake pressure. Thus, the prime mover is again slowed down so as to relieve driving pressure and the gears are unloaded sufficiently to permit same to shift. At this time there is no pressure in chambers 41 and 42. The spring 76 which is now stretched exerts a mechanical force urging the rod 74 rightwardly as appearing in the drawings and thereby urging the shift lever 31 from its high gear position toward neutral. With the unloading of the transmission gears, said shift into the neutral position is accomplished and the transposition valve 71 and the manual valve 61 assume the position shown in FIGURE 6. In this position of the transposition valve 71 the second governor 12 is now connected through the conduit 77 and port 78 to the port 81 and thence to the port 82 of the manual valve. With the manual valve in its rightward position, said port 82 is now connected to ports 84 and 101 of the manual valve which applies pressure from the second governor 12 to both of the ports 43 and 44 of the modulating valve 32. In this condition, the greater leftwardly acting force applied on areas 37A anad 37B through the ports 43 and 44 will overcome the force applied in the chamber 38 of the modulating valve 32 and will move the spool of said modulating valve leftwardly rapidly. When the spool 33 is moved leftwardly, port 48 is connected with vent port 47, thus relieving pressure in conduit 86 and at port 87. Thus, the pressure in chamber 22 is relieved and the shaft 6 is permitted to speed up. As the shaft 6 speeds up the pressure in chamber 38 increases and when the speeds of the gears next to be engaged cross, the force urging the spool rightwardly predominates over the leftwardly acting force in chambers 41 and 42. The valve spool moves rightwardly at a controlled rate whereby the port 47 is closed and the port 46 is opened at a controlled rate. The pressure at port 48 progressively increases so that the brake pressure in chamber 22 also progressively increases whereby the speed of shaft 6 is prevented from rising too far. The spool 33 can reach a position in response to the pressures from governors 11 and 12 so that the braking force is adjusted and, thus, the speed of shaft 6 is controlled so as to hold the gears to be engaged in synchronous relation.

Figure 7:
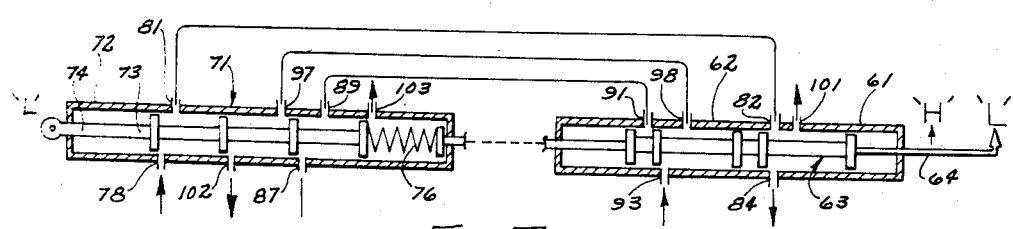
FIGURE 7 is a schematic representation of said two control valves in a third and final step of a downshift sequence.

The rod 74 will continue to respond to the mechanical force of the spring 76 to complete the shift into the low gear posiition (FIGURE 7). In this position, the port 97 is vented to port 102, as is also the port 98, so that pressure on the brake 13 is now relieved and the brake is disengaged. The turbine now effects acceleration of the shaft 6.

The shift of the rod 74 into its rightward position will continue the venting of the brake through the vent 102 and will not disturb the application of pressure from the second governor 12 to the port 78 and thence as above described, onto both of the ports 43 and 44 of the modulating valve whereby to hold the modulating valve 32 in its leftward position. This will not disturb the apparatus but same will be immediately cut off at the beginning of the next upshift when the manual valve 64 is moved leftwardly inasmuch as, referring back to FIGURE 2, the port 101 will be disconnected from the port 82. Thus at the beginning of the next shift, the core of the modulating valve 32 will immediately resume its rightward position and the next shift into high gear position will proceed as above outlined.

Thus, during a downshift, the brake 13 is initially applied under full pressure to relieve the driving force. When the transmission reaches neutral, the braking pressure will be released and the shaft 6 will speed up. When the speeds of the gears next to be engaged cross, then the braking force will be reapplied at a controlled value to maintain the shaft 6 substantially at the synchronous speed so that the shift can be completed easily.

It should be observed that the application of the brake 13 will not impose an appreciable jerk onto a vehicle being driven, inasmuch as said brake will be adjusted only to (1) in its initial application relieve the driving force at the input of the transmission and (2) when the transmission is in neutral to effect sufficient adjustment of the turbine speed to make the shift possible. Further, since the transmission goes into neutral position immediately upon the relieving of the driving force, no appreciable variation in the vehicle speed will be effected.

MODIFICATION

While the foregoing description has referred to a two-speed spur-gear transmission in order to more clearly explain the invention by reference to a simple embodiment thereof, it will be apparent that the invention can be applied with spur-gear transmissions which provide a greater number of speed ratios.

Figure 8:
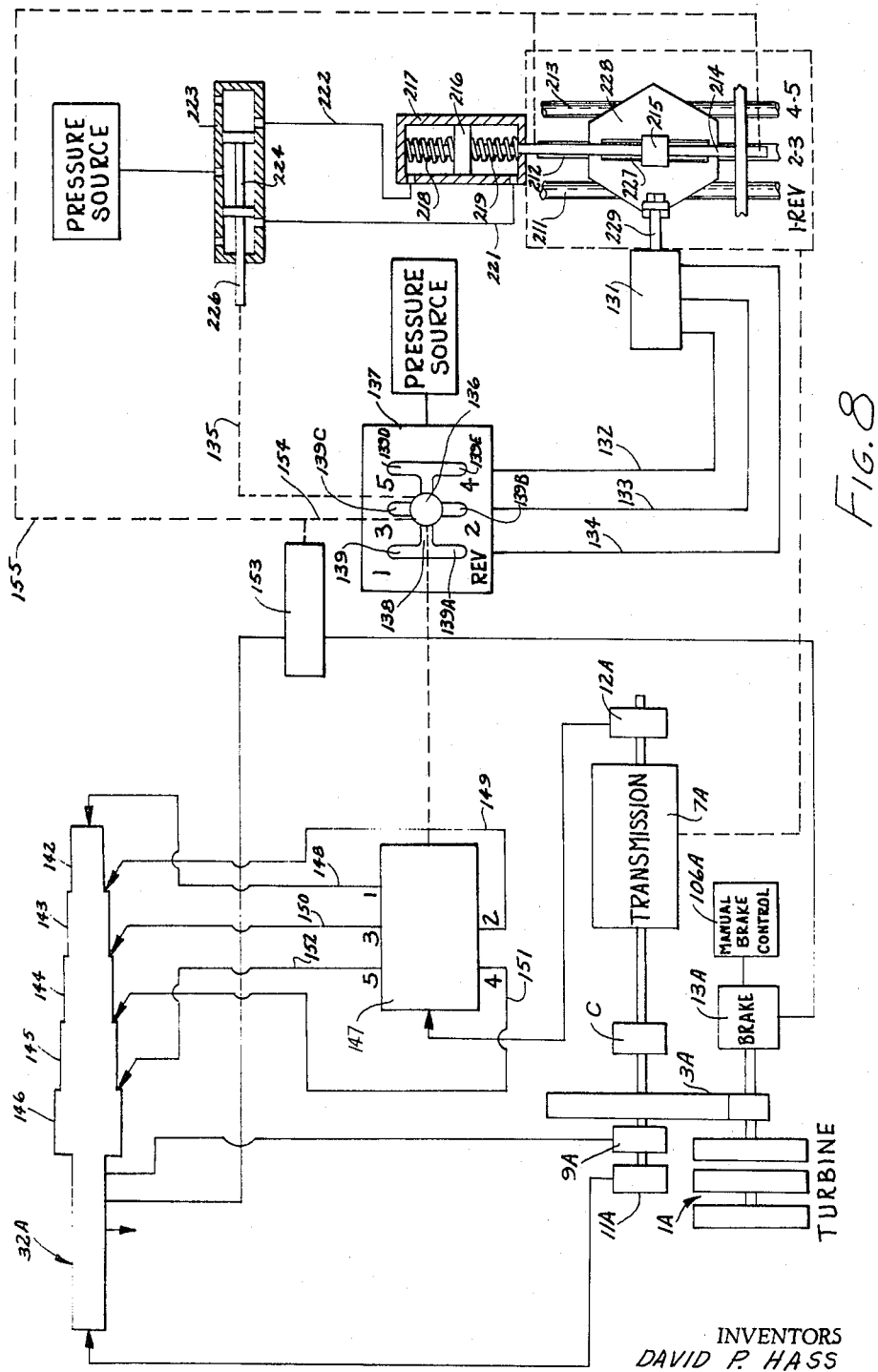
FIGURE 8 is a schematic diagram of a modification of the invention.

Referring to FIGURE 8, there is schematically disclosed a system comprising the same basic power train components as are present in the previously described embodiment of the invention. These components are identified by the same reference numbers with the suffix "A" added thereto. The transmission 7A is of a conventional spur-gear type and it has five forward speed ratios and a reverse ratio. In order to shift the transmission, the same is provided with three shift rails 211, 212 and 213 which are arranged for reciprocation in a conventional fashion. The shift rails have shift forks coupled to double-acting clutches (not shown) in a conventional manner. A reciprocable rod 214 carries a shift finger 215 which can be pivoted transversely of the lengthwise axis of said rod so that it can alternatively engage the shift rails 211, 212 and 213. The rod 214 is connected to a piston 216 which is reciprocable in the cylinder 217. The piston 216 is urged to a center position by the springs 218 and 219 and said center position corresponds to the neutral position of the transmission. Fluid pressure can be supplied to opposite ends of the cylinder 217 by conduits 221 and 222 in order to move the rod 214 in one direction or the opposite direction out of neutral in order to shift the transmission. Fluid pressure is supplied alternatively to the conduits 221 and 222 by a valve 223. The spool 224 of the valve is reciprocable by a rod 226.

The shift finger 215 extends through a slot 227 in a plate 228 which can be moved transversely of the shift rails 211, 212 and 213 in order to move the shift finger from one rail to another. The plate 228 is connected to a reciprocable piston rod 229 which extends into a cylinder 131. The rod 229 can be selectively positioned in any one of three positions, corresponding to positions in which the shift finger 215 engages the rails 211, 212 and 213, respectively, by supplying pressure fluid through the conduits 132, 133 and 134 to the cylinder 131.

A shift lever 136 is mounted in a shift block 137 and it is movable through a neutral passage 138 and into a plurality of slots 139–139E which extend transversely to said neutral passage whereby the shift lever can establish the speed ratios of the transmission. The shift lever 136 is connected to the rod 226 by a connection 135 of any suitable type so that the spool of the valve 223 is moved lengthwise in the valve casing in response to movement of said shift lever in a direction transverse of the passage 138. When the shift lever 136 is positioned in the passage 138 the transmission is in neutral. When the shift lever 136 is moved, while in the passage 138, into alignment with one of the three pairs of aligned slots 139–139A, 139B–139C and 139D–139E, fluid pressure is supplied to the conduits 132, 133 and 134 so as to move the piston rod 229 to position the shift finger 215 in engagement with the corresponding one of the shift rails 211, 212 and 213. Then, when the shift lever 136 is moved in one direction or the other out of the passage 138 into a slot 139–139E, the valve 223 is shifted so that pressure fluid is supplied to one end or the other end of the cylinder 217 whereby the engaged shift rail is moved lengthwise to establish a gear ratio in the transmission.

The shifting structure above described is substantially the same as that discolsed in U.S. Patent No. 2,931,237 and reference may be made to that patent for a more detailed description.

The brake pressure transmitting valve 32A can be substantially the same as the valve 32 previously described except for the fact that it is provided with five separate chambers 142–146, instead of the two chambers 41 and 42 provided in the valve 32. Thus, in this embodiment the same number of chambers are provided at the rightward end of valve 32A as there are forward speeds in the transmission so that a proper sensing of the speed ratios of the input and output shafts of the transmission can be made for each of the forward speed ratios of the transmission.

The governor pressure from governor 11A is supplied to the leftward end of the valve 32A in the same manner as in the previously described embodiment. The governor pressure from governor 12A is supplied to a valve 147 from which extend conduits 148–152 which are respectively connected to the chambers 142–146. The valve 147 has a fluid distributing core or spool which is coupled by any suitable connection to the shift lever 136 so that when the shift lever is moved into one of the transverse slots 139–139E to establish a speed ratio in the transmission, fluid is simultaneously supplied through one of the conduits 148–152 to the corresponding one of the chambers 142–146 so that the valve 32A will respond to the speeds of the input and output shafts of the transmission and the spool of said valve will be shifted in response to said speeds as in the previously described embodiments. The chambers 142–146 provide pressure surface areas of different size so that the pressure from governor 12A will be multiplied by an area factor corresponding to the ratio of the input shaft speed and output shaft speed for each of the forward speed ratios so that synchronism will be detected in the same manner as in the previously described embodiment.

The valve 32A controls the flow of pressure fluid from the pump 9A to the brake 13A. When the output shaft speed exceeds its synchronous speed with the input shaft speed for the particular forward gear ratio being established, then the spool of valve 32A is shifted leftwardly to terminate supply of the pressure fluid to the valve 153. When the output shaft speed is less than its synchronous speed with respect to the input shaft speed, then the spool of the valve is shifted rightwardly to supply pressure fluid to the valve 153. The pressure supplied from valve 32A to valve 153 will be modulated as in the previously described embodiment.

The valve 153 has a control element coupled by a connection 154 of any suitable type to the shift lever 136 so that as the shift lever moves out of a slot 139–139E toward neutral at the start of a shift, the valve 153 will be positioned so as to transmit pressure fluid from valve 32A to the brake 13A to apply the brake. The control element of valve 153 is also connected by a connection 155 to the shift rod 214. When the shift rod 214 is moved to either of its shifted positions, the valve 153 is shifted to connect the brake 13A to exhaust.

The operation of this embodiment will be briefly described to insure a complete understanding of the invention.

When the transmission is in first gear, the shift finger 215 is engaged with rail 211 and rod 214 is in its upward position. When the shift lever 136 is moved in slot 139 toward passage 138, the valve 153 is actuated to supply pressure fluid to brake 13A. This relieves the driving pressure on the engaged gear teeth of the transmission so that the transmission can be shifted. The spool 224 of valve 223 will be shifted to relieve pressure in cylinder 217 so that the rod 214 and thereby the rail 211 is shifted to neutral by the springs 218, 219. When the transmission is in neutral and the shift lever is moved lengthwise in passage 138 from slot 139 to slot 139B, the shift finger 215 is shifted from rail 211 to rail 212. As the shift lever is moved out of passage 138 into slot 139B, the valve 147 is operated to supply pressure fluid from the "2" port thereof to chamber 143 whereby the valve 32A then is acted upon by fluid pressures whose values are functions of the speeds of the input and output shafts of the transmission. When the speeds of said shafts are in the right relationship for establishing second gear, then the shift rod 211 is moved downwardly and the shift into second gear is completed. The valve 32A operates in the same way as in the previously described embodiment to apply a modulated braking force during the shifting operation.

The shifts from second to third gear and so on are effected in the same way.

It will be apparent that the specific illustrations, including those of the valves, are schematic only and may be embodied in a commercial construction by any of many specific forms of apparatus.

The brake means 13 can be a retarder, as disclosed in U.S. Patent No. 3,291,268, instead of a disc brake as illustrated in FIGURE 1. It will be understood, however, that since a turbine does not employ a cooling water circuit, if a retarder is used, a separate cooling circuit for the hydrodynamic braking fluid will be required.

It will be further realized that since the apparatus here described effects an affirmative control over the input speed of the transmission (as contrasted with merely signalling the relationship of input speed to the output speed) and since the force applied to the brake is continuously variable in response to the input and output speeds, the input speed of the transmission will be continuously controlled and modified to maintain a predetermined ratio relationship to the output speed thereof. Hence, the previously existing problems inherent in shifting heavy duty transmissions namely, the rapid changes in relative speeds and the consequent need for utilizing virtually the precise instant of synchronization, are no longer a requirement. Instead, shifting can be initiated as soon as synchronization is attained, or approximately attained, and same will be maintained at least within acceptable limits throughout the shifting procedure. Thus, the very delicate presensing of an approaching synchronous condition such as set forth in the above-mentioned Patent No. 2,943,582, is unnecessary and, within the limits of acceptable speed variation in the vehicle concerned, the speeds of both input and output may be permitted to fluctuate widely since they will remain in the predetermined relationship to each other.

While the modulating valve 32 has been described as a continuously variable valve for continuously and progressively varying its output in response to the relative speeds of the input and output ends of the transmission, it will be recognized that it may within the scope of the invention be utilized also as an on-off type of valve. In such case, when the valve signals an application of the brake, the engine speed will be drawn down to a point below the desired speed at which time the brake will be released and the engine speed will increase to a point at which the valve again signals and effects an application of the brake. Thus, by rapid on and off conditions of the brake, the input speed of the transmission can be held sufficiently close to the desired speed to present an operable structure. This has the possible advantage of somewhat simplifying the apparatus and in certain instances may be acceptable. However, since it permits a completely off condition of the brake which will result in an extremely rapid increase in turbine speed, it is likely to be excessively jerky and insufficiently reliable for most applications.

While the foregoing described invention was developed primarily for use with gas turbines and is especially well adapted to overcome the problems otherwise created by their high thermal inertia, it also has application to other types of engines which, through thermal inertia or otherwise have a tendency to overspeed when the load is removed even though the fuel supply is simultaneously cut off. Additionally, the invention will be applicable to a reciprocating engine where, for whatever reason may be applicable, the throttle setting is maintained at some point above its idling position after the declutching normally incident to shifting a spur gear transmission.

Although a particular preferred embodiment of the invention has been disclosed above in detail for illustrative purposes, it will be understood that obvious or equivalent variations or modifications of such disclosure are fully contemplated.

The embodiments of the invention in which an exclusive property or privilege is claimed are defined as follows:

1. A drive system, including in combination:
   a prime mover;
   a change-speed, shiftable, gear transmission having at least two speeds and including an input, an output and at least two ratio-changing gear means comprising positively interengageable gears interposed between said input and said output, said transmission having a neutral position wherein said input and output of said transmission are disengaged;

means operatively connecting said prime mover to said input of said transmission;

a brake device operatively connected to said prime mover for controlling the speed thereof; and control means operatively connected to said brake device to control the operation thereof to (1) prevent excessive speed of said prime mover when said transmission is in said neutral position and (2) synchronize the rotational speeds of said input and output to a predetermined speed ratio relationship to permit shifting between two speeds through a neutral position while said input and output are rotating.

2. A drive system, primarily for automotive use, comprising:

a turbine;

a change-speed, shiftable, gear transmission having at least two speeds and including an input, an output and a plurality of ratio-changing gear sets comprised of meshable gears interposed between said input and said output, said transmission having a neutral position wherein said input and said output of said transmission are disengaged;

means connecting said turbine to said input of said transmission;

a brake device operatively connected to said turbine for controlling the speed thereof; and control means operatively connected to said brake device to control the operation thereof to (1) prevent excessive speed of said turbine when said transmission is in said neutral position and (2) synchronize the rotational speeds of said input and output to a predetermined speed ratio relationship to permit shifting between two speeds through a neutral position while said input and output are rotating.

3. A drive system, primarily for automotive use, comprising:

a turbine;

a change-speed gear transmission having an input, an output and a plurality of ratio-changing gear sets comprised of meshable gears interposed between said input and said output, said transmission having a neutral position wherein said input and said output of said transmission are disengaged;

means connecting said turbine to said input of said transmission;

brake means operatively connected to said turbine when said transmission is in neutral position for preventing turbine runaway;

means for providing a first signal whose value is a function of the speed of said input;

means for providing a second signal whose value is a function of the speed of said output; and means for responding to said signals to control the application of said brake means during a shifting operation.

4. A drive system, primarily for automotive use, comprising:

a turbine;

a change-speed gear transmission having an input, an output and a plurality of ratio-changing gear sets comprised of meshable gears interposed between said input and said output, said transmission having a neutral position wherein said input and said output of said transmission are disengaged;

means connecting said turbine to said input of said transmission;

brake means operatively connected to said turbine when said transmission is in neutral position for preventing turbine runaway;

means for providing a fluid at a first pressure which is a function of the speed of said input;

means for providing a fluid at a second pressure which is a function of the speed of said output;

shiftable modulating valve means connected for responding to said first and second pressures; and means coupling said modulating valve means to said brake means for controlling the application of said brake means.

5. A drive system, primarily for automotive use, comprising:

a turbine;

a change-speed gear transmission having an input, an output and a plurality of ratio-changing gear sets comprised of meshable gears interposed between said input and said output, said transmission having a neutral position wherein said input and said output of said transmission are disengaged;

means connecting said turbine to said input of said transmission;

brake means operatively connected to said turbine when said transmission is in neutral position for preventing turbine runaway;

means responsive to the shifting of said transmission toward neutral for applying said brake means, said last-moved means including first valve means for supplying pressure fluid to said brake means;

manually operable means for shifting said first valve means to a position in which it causes said brake means to be applied; and release means for releasing said brake means substantially by the time said transmission has entered its next shifted position, said release means being responsive to the speeds of said input and output for relieving the pressure on said brake means.

6. A drive system according to claim 5, including second valve means for supplying pressure fluid to said first valve means, said second valve means being shiftable between positions in which it supplies pressure fluid to said first valve means and positions in which it does not supply pressure fluid to said first valve means.

7. A drive system including in combination:

a prime mover having the characteristic that it will develop excessive speed upon the removal of load therefrom;

a change-speed, shiftable, gear transmission having an input and output and at least first and second gear trains adapted to be connected between said input and output to provide selectable drive ratios therebetween, shiftable toothed means associated with the gear trains to selectively positively interconnect one of said gear trains between said input and output, and said transmission further having a neutral position wherein said shiftable toothed means are positioned such that said input and output of said transmission are disconnected;

means operatively connecting said prime mover to the input of said transmission;

speed diminishing means operatively connected to said prime mover;

translating means responsive to the commencement of a shifting operation for activating said speed diminishing means prior to the disconnection of the driving interconnection through a gear train between said input and output whereby to remove load therefrom and facilitate said disconnection.

8. The device defined in claim 7 wherein said translating means continue to activate said speed diminishing means during the period that said transmission is in neutral for preventing runaway of said prime mover.

9. The apparatus defined in claim 8 including first speed sensitive means sensing the input speed of said transmission and second speed sensitive means for sensing the output speed of said transmission, modulating means activated by said speed sensitive means for comparing said speeds and delivering a signal;

control means responsive to said signal for increasing or decreasing the degree of activation of said speed diminishing means;

whereby to control the input speed of said transmission as necessary to maintain same in a preselected relationship with the output speed thereof during the shifting sequence, release of said speed diminishing means permitting said prime mover to increase the input speed of said transmission and further activation of said speed diminishing means acting against said prime mover to decrease the input speed of said transmission and thereby to cause same to follow the output speed thereof as necessary to effect and maintain such relationship.

10. The device defined in claim 9 wherein said speed diminishing means is a friction-type brake.

11. The device defined in claim 9 wherein said speed diminishing means is a fluid retarder.

12. The device defined in claim 7 wherein said translating means includes means for continuously comparing input and output speeds of said transmission and for continuously modulating said input speed to maintain a predetermined ratio relationship to said output speed so as to substantially synchronize the speeds of a pair of toothed means which are about to be engaged during a shifting sequence.

References Cited

UNITED STATES PATENTS

| | | | |
|---|---|---|---|
| 3,181,677 | 5/1965 | Fisher et al. | 192—4 |
| 3,309,934 | 3/1967 | Gustafsson et al. | 74—339 |
| 3,269,206 | 8/1966 | Carr | 74—874 |
| 3,234,902 | 2/1966 | Booth | 60—39.16 |
| 2,961,078 | 11/1960 | Shannon et al. | 192—4 |

ARTHUR T. McKEON, Primary Examiner

U.S. Cl. X.R.

74—339